(12) United States Patent
Toyota et al.

(10) Patent No.: US 7,791,695 B2
(45) Date of Patent: Sep. 7, 2010

(54) LIQUID CRYSTAL DISPLAY DEVICE

(75) Inventors: Yoshiaki Toyota, Hachioji (JP); Shinya Yamaguchi, Mitaka (JP); Kyoko Kojima, Kunitachi (JP); Takeshi Ishida, Kodaira (JP)

(73) Assignee: Hitachi Displays, Ltd., Chiba (JP)

( * ) Notice: Subject to any disclaimer, the term of this patent is extended or adjusted under 35 U.S.C. 154(b) by 130 days.

(21) Appl. No.: 12/289,671

(22) Filed: Oct. 31, 2008

(65) Prior Publication Data

US 2009/0115950 A1    May 7, 2009

(30) Foreign Application Priority Data

Nov. 1, 2007    (JP) .............................. 2007-284670

(51) Int. Cl.
*G02F 1/1333* (2006.01)
*G02F 1/13* (2006.01)
*H01L 21/00* (2006.01)

(52) U.S. Cl. ........................ 349/114; 349/122; 349/187; 438/30

(58) Field of Classification Search ................. 349/114, 349/34, 38, 39, 41, 42, 43, 52, 122, 138, 349/139, 187; 438/30

See application file for complete search history.

(56) References Cited

U.S. PATENT DOCUMENTS 6,891,588 B2 * 5/2005 Kawachi et al. ............. 349/114

2007/0097303 A1    5/2007 Sonoda et al. ............... 349/122
2008/0074594 A1 *  3/2008 Tanabe et al. ............... 349/114
2009/0115950 A1 *  5/2009 Toyota et al. ............... 349/114
2009/0219473 A1 *  9/2009 Fujioka et al. ............... 349/114

FOREIGN PATENT DOCUMENTS

JP    2007-121587    10/2005    ............. 349/122 X

* cited by examiner

*Primary Examiner*—Brian M Healy
(74) *Attorney, Agent, or Firm*—Stites & Harbison PLLC; Juan Carlos A. Marquez, Esq.

(57) ABSTRACT

A liquid crystal display device is provided having a transmissive region and a reflective region in a pixel region in which a protective film is formed covering a thin film transistor over a substrate, wherein in the reflective region, an uneven surface is formed on a surface of the protective film, and a capacitor electrode which comprises a transparent conductive film and which is electrically connected to a source electrode of the thin film transistor, a first capacitor insulating film, and a reflective plate which also functions as an opposing electrode and in which the uneven surface formed on the protective film surfaces and appears with the capacitor electrode and the first capacitor insulating film therebetween are formed over the surface of the protective film, a second capacitor insulating film and a pixel electrode are formed covering the reflective region and the transmissive region.

16 Claims, 11 Drawing Sheets

LIQUID CRYSTAL DISPLAY DEVICE

CLAIM OF PRIORITY

The present application claims priority from Japanese application JP 2007-284670 filed on Nov. 1, 2007, the content of which is hereby incorporated by reference into this application.

BACKGROUND OF THE INVENTION

1. Field of the Invention

The present invention relates to a liquid crystal display device, and in particular, to a transflective liquid crystal display device having a reflective region in a pixel.

2. Description of the Related Art

A transflective liquid crystal display device has a transmissive region and a reflective region in a region of each pixel.

The transflective liquid crystal display device is formed such that transmitting light transmitting from a backlight through the liquid crystal in each pixel is irradiated to an observer in the transmissive region and reflected light transmitting from external light such as sunlight through the liquid crystal in each pixel is irradiated to the observer in the reflective region.

With such a structure, for example, an advantage can be obtained in which a liquid crystal display device can be obtained in which, for example, the backlight can be switched off and the displayed image can be recognized in outdoors so that the power consumption can be reduced.

In addition, in the liquid crystal display device having such a structure, a reflective plate which is made of a metal and which also functions as one electrode of a pair of electrodes for creating an electric field in the liquid crystal is placed in the reflective region of the pixel.

Because the display quality can be improved by scattering the reflected light in the reflective region and irradiating the scattered light to the observer, a structure is known in which, in the reflective plate, an uneven surface is formed on a surface of an insulating film over which the reflective plate is formed, and the uneven surface surfaces and appears on the surface of the reflective plate formed covering the uneven surface.

The liquid crystal display device having such a structure is disclosed in, for example, JP 2007-121587 A.

The liquid crystal display device disclosed in JP 2007-121587 A also has a structure in which a storage capacitor is formed in the reflective region of the pixel between the reflective plate and the other electrode with a capacitor insulating film therebetween, the capacitor insulating film being formed over an upper surface of the reflective plate and the other electrode being formed over an upper surface of the capacitor insulating film and forming a pair with the reflective plate.

SUMMARY OF THE INVENTION

In the liquid crystal display device, however, it has been pointed out that a sufficient capacity cannot be secured with the storage capacitor having the above-described structure and the contrast is reduced.

Because of this, in order to improve the capacity of the storage capacitor, attempts have been made to form the capacitor insulating film with a thin thickness or to form a separate storage capacitor in a part of the region of the pixel.

In this case, in the former configuration, it is difficult to secure the flatness of the surface of the capacitor insulating film, and in the latter configuration, a disadvantage must be tolerated that reduction in the aperture ratio of the pixel cannot be avoided.

In addition, when a separate storage capacitor is formed in addition to an already-existing storage capacitor, there is a disadvantage that the number of manufacturing steps is increased accordingly.

An advantage of the present invention is that a liquid crystal display device is provided having a large storage capacity without a loss of flatness of the insulating film.

Another advantage of the present invention is that a liquid crystal display device is provided having a large storage capacity without a reduction of an aperture ratio of the pixel.

Yet another advantage of the present invention is that a manufacturing method of a liquid crystal display device is provided in which the number of manufacturing steps is reduced.

Of various forms of the present invention disclosed herein, the representative configurations are the following.

According to one aspect of the present invention, there is provided a liquid crystal display device having a transmissive region and a reflective region in a pixel region in which a protective film is formed covering a thin film transistor over a substrate, wherein, in the reflective region, an uneven surface is formed on a surface of the protective film, and a capacitor electrode which comprises a transparent conductive film and which is electrically connected to a source electrode of the thin film transistor through a first through hole formed through the protective film, a first capacitor insulating film, and a reflective plate which also functions as an opposing electrode and in which the uneven surface formed on the protective film surfaces and appears with the capacitor electrode and the first capacitor insulating film therebetween are formed over the surface of the protective film on which the uneven surface is formed, in the transmissive region, an opposing electrode which comprises a transparent conductive film is formed over the surface of the protective film, a second capacitor insulating film is formed covering the reflective region and the transmissive region, and a pixel electrode which comprises a transparent conductive film and which is electrically connected to the source electrode of the thin film transistor through a second through hole formed through the second capacitor insulating film is provided over an upper surface of the second capacitor insulating film in the reflective region and the transmissive region.

According to another aspect of the present invention, it is preferable that, in the liquid crystal display device, the reflective plate formed in the reflective region and the opposing electrode formed in the transmissive region are electrically connected to each other.

According to another aspect of the present invention, it is preferable that, in the liquid crystal display device, the reflective plate formed in the reflective region forms a surface-shaped electrode, and the pixel electrode formed in the reflective region with the second capacitor insulating film therebetween forms a plurality of aligned line-shaped electrodes.

According to another aspect of the present invention, it is preferable that, in the liquid crystal display device, the opposing electrode formed in the transmissive region forms a surface-shaped electrode, and the pixel electrode formed in the transmissive region with the second capacitor insulating film therebetween forms a plurality of aligned line-shaped electrodes.

According to another aspect of the present invention, it is preferable that, in the liquid crystal display device, the first through hole formed through the protective film and the second through hole formed through the second capacitor insulating film are coaxially formed.

According to another aspect of the present invention, it is preferable that, in the liquid crystal display device, an opposing voltage common signal line is placed at least at a part of a periphery of an image display region in which a plurality of pixels are placed, the reflective plate is commonly connected to a reflective plate of a pixel which is adjacent over a drain signal line which is connected to a drain electrode of the thin film transistor, and the commonly connected reflective plate is electrically connected to the opposing voltage common signal line.

According to another aspect of the present invention, it is preferable that, in the liquid crystal display device, an opposing voltage common signal line is placed at least at a part of a periphery of an image display region in which a plurality of pixels are placed, the opposing electrode is commonly connected to an opposing electrode of a pixel which is adjacent over a drain signal line which is connected to a drain electrode of the thin film transistor, and the commonly connected opposing electrode is electrically connected to the opposing voltage common signal line.

According to another aspect of the present invention, it is preferable that, in the liquid crystal display device, the substrate comprises one of glass, quartz glass, and plastic.

According to another aspect of the present invention, it is preferable that, in the liquid crystal display device, the thin film transistor is of a bottom-gate type or a top-gate type.

According to another aspect of the present invention, there is provided a liquid crystal display device having a first substrate and a second substrate which are placed opposing each other with liquid crystal therebetween, wherein an opposing electrode is formed over a surface of the second substrate on the side near the liquid crystal, a transmissive region and a reflective region are provided in a pixel region in which a protective film is formed covering a thin film transistor over a surface of the first substrate on the side near the liquid crystal, in the reflective region, an uneven surface is formed on a surface of the protective film, and a capacitor electrode which comprises a transparent conductive film and which is maintained at a same potential as the opposing electrode, a first capacitor insulating film, and a reflective plate which is electrically connected to a source electrode of the thin film transistor through a through hole formed through the protective film and in which the uneven surface formed on the protective film surfaces and appears with the capacitor electrode and the first capacitor insulating film therebetween are formed over the surface of the protective film on which the uneven surface is formed, and, in the transmissive region, a pixel electrode which comprises a transparent conductive film and which is electrically connected to the source electrode of the thin film transistor through the through hole is formed over the surface of the protective film.

According to another aspect of the present invention, it is preferable that, in the liquid crystal display device, a second capacitor insulating film which is formed covering the reflective plate is provided in the reflective region.

According to another aspect of the present invention, it is preferable that, in the liquid crystal display device, an opposing voltage common signal line is placed at least at a part of a periphery of an image display region in which a plurality of pixels are placed, the capacitor electrode is commonly connected to a capacitor electrode of a pixel which is adjacent over a drain signal line which is connected to a drain electrode of the thin film transistor, and the commonly connected capacitor electrode is electrically connected to the opposing voltage common signal line.

According to another aspect of the present invention, it is preferable that, in the liquid crystal display device, the substrate comprises one of glass, quartz glass, and plastic.

According to another aspect of the present invention, it is preferable that, in the liquid crystal display device, the thin film transistor is of a bottom-gate type or a top-gate type.

According to another aspect of the present invention, there is provided a method of manufacturing a liquid crystal display device, wherein a capacitor electrode which is formed over an insulating film, a capacitor insulating film which is formed over the capacitor electrode, and a reflective plate which is formed over the capacitor insulating film are sequentially formed in a reflective region of a pixel, wherein a storage capacitor is formed with the capacitor electrode, the capacitor insulating film, and the reflective plate, and the capacitor insulating film and the reflective plate are formed by sequentially forming a material layer for forming the capacitor insulating film and a material layer for forming the reflective plate, and simultaneously patterning the material layers.

According to another aspect of the present invention, it is preferable that, in the manufacturing method, an uneven surface is formed on a surface of the insulating film, and the capacitor electrode, the capacitor insulating film, and the reflective plate are layered over the surface of the insulating film on which the uneven surface is formed, and, in the reflective plate, the uneven surface which is formed on the insulating film surfaces and appears with the capacitor electrode and the capacitor insulating film therebetween.

The present invention is not limited to the above-described configurations, and various modifications may be made within the scope and spirit of the present invention.

A liquid crystal display device having such a structure has a large storage capacity without a loss of the flatness of the insulating film.

In addition, a large storage capacity can be obtained without a reduction in the aperture ratio of the pixel.

Moreover, according to the method of manufacturing the liquid crystal display device, the number of manufacturing steps can be reduced.

DETAILED DESCRIPTION OF THE INVENTION

Preferred embodiments of a liquid crystal display device according to the present invention will now be described with reference to drawings.

First Preferred Embodiment

[Overall Equivalent Circuit]

Figure 2:
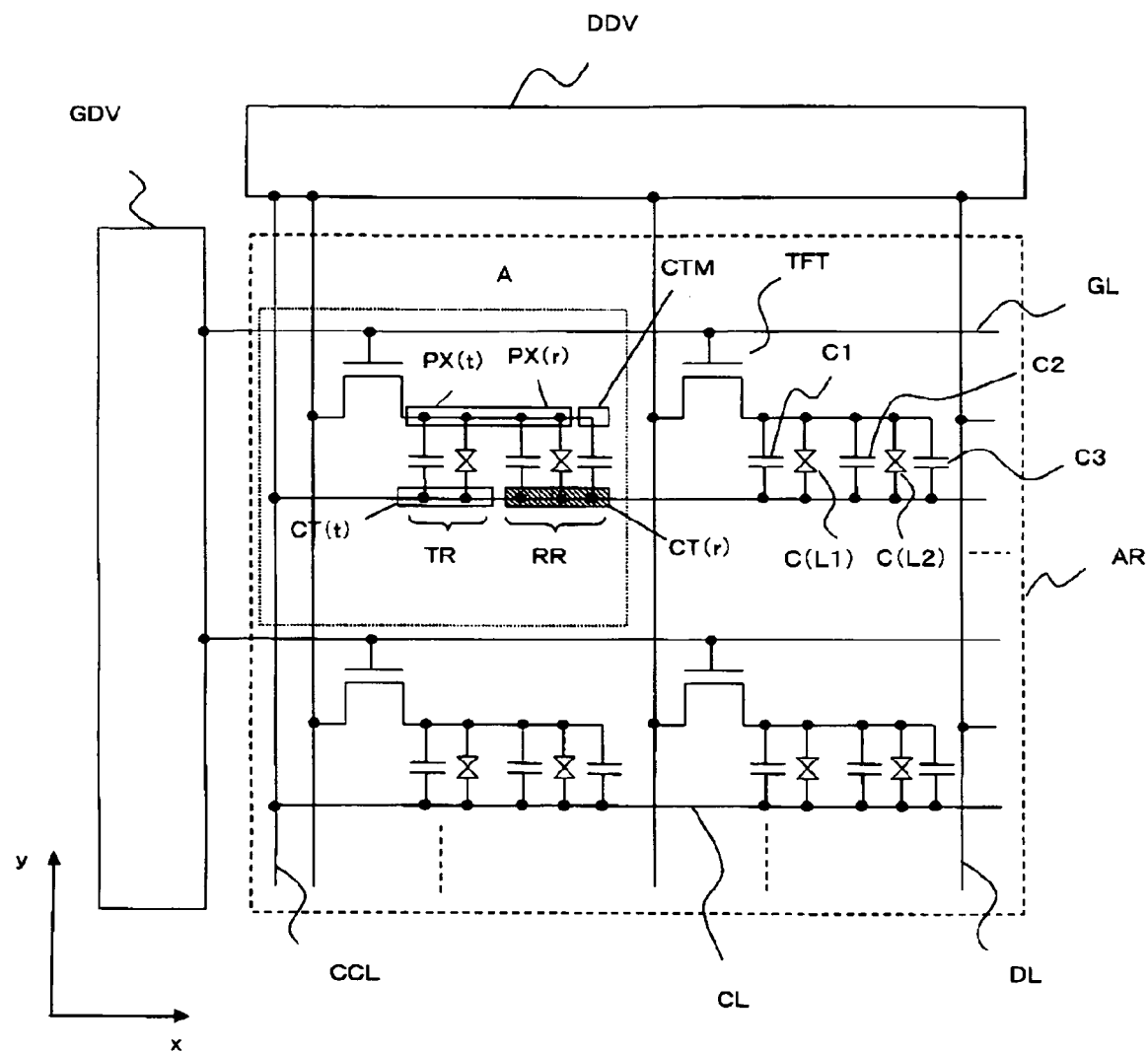
FIG. 2 is an equivalent circuit diagram showing a liquid crystal display device according to a first preferred embodiment of the present invention.

FIG. 2 is an equivalent circuit diagram of a liquid crystal display device according to various aspects of the present embodiment, which is called an IPS (In Plane Switching) liquid crystal display device. FIG. 2 is an equivalent circuit diagram formed over a surface, on the side near liquid crystal, of one substrate (shown with a reference SUB1) of a pair of substrates which are placed opposing each other with the liquid crystal therebetween. Although FIG. 2 is an equivalent circuit diagram, FIG. 2 also is drawn to correspond to the actual geometric placement.

In FIG. 2, first, gate signal lines GL which are formed extending in an x direction in FIG. 2 are formed aligned in a y direction in FIG. 2. Each of the gate signal lines GL is connected at the left end of FIG. 2 to a gate driver GDV. A scan signal is supplied to each gate signal line GL in a sequentially repeating manner by the gate driver GDV in the order, for example, from a gate signal line GL at an upper side to a gate signal line GL at a lower side, and returning to the gate signal line GL at the upper side.

Drain signal lines DL which are formed extending in the y direction in FIG. 2 are formed aligned in the x direction. Each of the drain signal lines DL is connected to a drain driver DDV at an upper end of FIG. 2. An image signal is supplied by the drain driver DDV to each drain signal line DL in a timing which matches the timing of supply of each scan signal from the gate driver GDV.

A region of a rectangular shape surrounded by a pair of adjacent gate signal lines GL and a pair of adjacent drain signal lines DL is a region in which a pixel is formed (pixel region: within a dotted line frame A in FIG. 2), and an image display region AR is formed by a group of the pixel regions.

As will become apparent from the later description of a structure of the pixel, each pixel region has a transmissive region TR and a reflective region RR which are region-wise separated.

In the pixel region, a thin film transistor TFT which is switched ON by a scanning signal from one of the gate signal lines GL adjacent to the pixel region, a pixel electrode PX to which an image signal from one of the drain signal lines DL adjacent to the pixel region is supplied through the thin film transistor TFT when the thin film transistor TFT is switched ON, and an opposing electrode CT to which a signal (voltage) which forms a reference with respect to the image signal (voltage) supplied to the pixel electrode PX is supplied are provided.

The pixel electrode PX is formed both in the transmissive region TR and the reflective region RR, and the pixel electrode PX in these regions are distinguished in this description by referring to the pixel electrode PX formed in the transmissive region TR as PX(t) and the pixel electrode PX formed in the reflective region RR as PX(r).

In the present embodiment, one capacitor electrode CTM of a storage capacitor C3 to be described later which is electrically connected to the pixel electrodes PX(t) and PX(r) is provided in the reflective region RR.

The other capacitor electrode of the storage capacitor C3 is an opposing electrode CT(r) in the reflective region RR.

The pixel electrodes PX(t) and PX(r) are electrically connected to each other within the pixel so that they have the same potential during driving of the pixel.

The opposing electrode CT is also formed both in the transmissive region TR and the reflective region RR, and the opposing electrode CT in these regions are distinguished in this description by referring to the opposing electrode CT formed in the transmissive region TR as CT(t) and the opposing electrode CT formed in the reflective region RR as CT(r).

As described above, the opposing electrode CT(r) in the reflective region RR is configured to function as a reflective plate, and also function as the other capacitor electrode of the storage capacitor C3 to be described later.

The opposing electrodes CT(t) and CT(r) are electrically connected to each other within the pixel so that they have the same potential during display of a pixel.

To the opposing electrodes CT(t) and CT(r), a reference signal is supplied through an opposing voltage common signal line CCL which is connected to, for example, the drain driver DDV and which is placed, for example, on the left side of FIG. 2 of the image display region AR, and an opposing voltage signal line CL which is connected to the opposing voltage common signal line CCL and which is placed, for example, in parallel to the gate signal line GL.

In addition, a storage capacitor C1 and a liquid crystal capacity C (L1) are formed between the pixel electrode PX(t) and the opposing electrode CT(t) in the transmissive region TR, and a storage capacitor C2, a liquid crystal capacity C (L2), and the storage capacitor C3 are formed between the pixel electrode PX(r) and the opposing electrode CT(r) in the reflective region RR.

Figure 6:
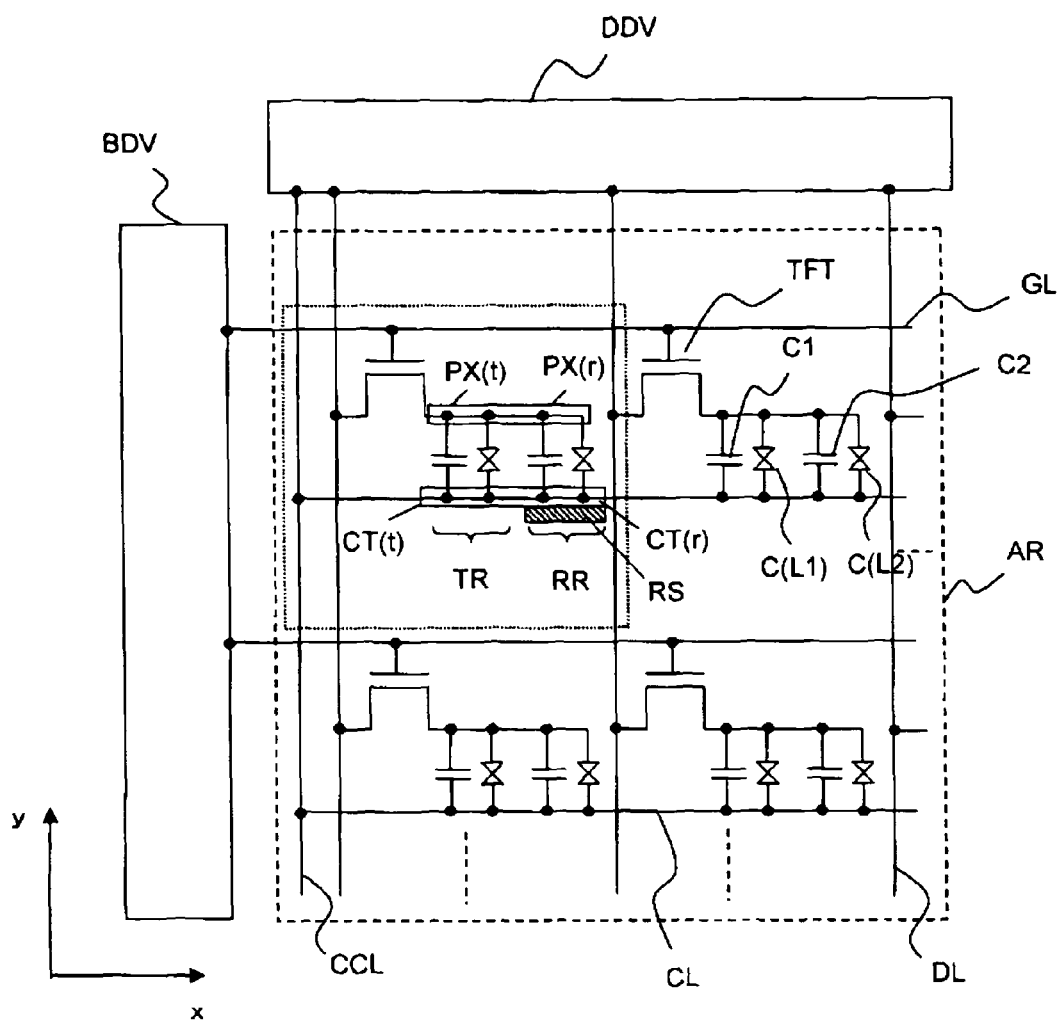
FIG. 6 is an equivalent circuit diagram showing an example of a liquid crystal display device of related art.

FIG. 6 is an overall equivalent circuit diagram of a liquid crystal display device of related art, and is drawn corresponding to FIG. 2. Members shown with the same reference numerals are members having the same function.

As is clear from a comparison of FIGS. 2 and 6, in FIG. 2, the storage capacitor C3 is provided in the reflective region RR, one of the capacitor electrodes is connected to the pixel electrodes PX(t) and PX(r), and the other capacitor electrode is the opposing electrode CT(r) which also functions as the reflective plate, while in FIG. 6, the storage capacitor C3 is not provided.

In addition, in the pixel of the liquid crystal display device of related art shown in FIG. 6, the opposing electrode CT in the transmissive region TR and the reflective region RR is commonly formed with a transparent conductive layer, and the reflective plate RS which is required in the reflective region RR is formed directly overlapping the opposing electrode CT.

[Structure of Pixel]

Figure 1:
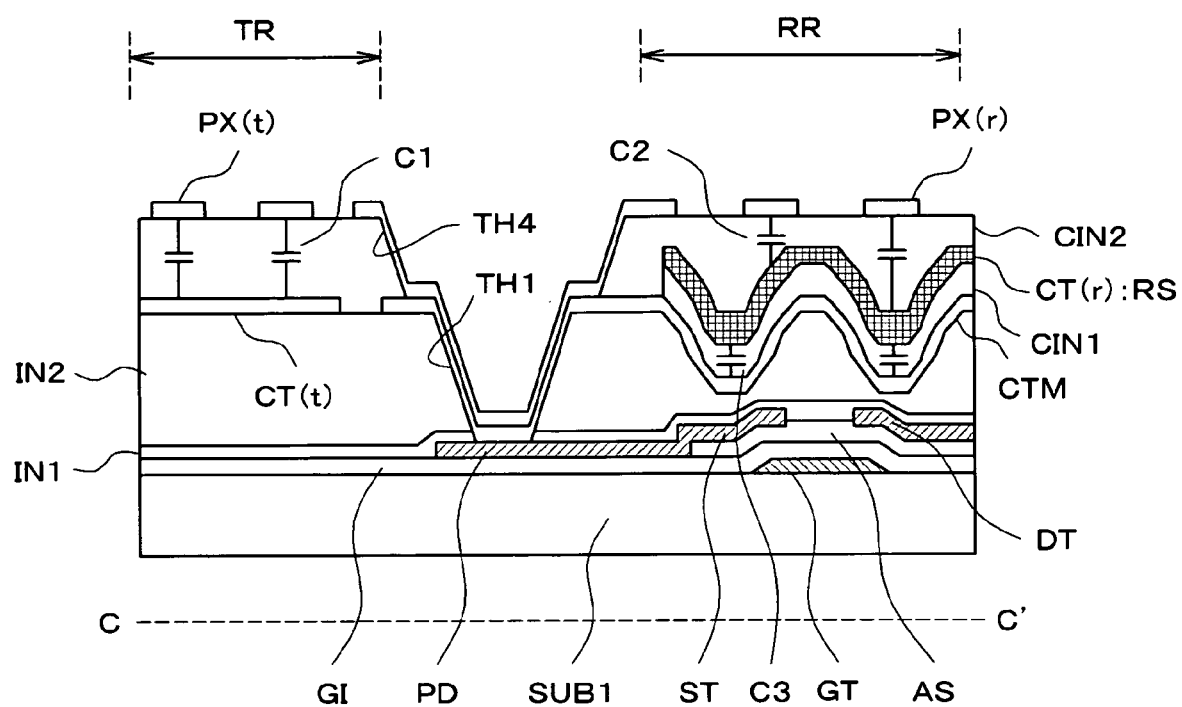
FIG. 1 is an important-part cross sectional view showing a liquid crystal display device according to a first preferred embodiment of the present invention and is a cross sectional view along a C-C' line of FIG. 3.
Figure 3:
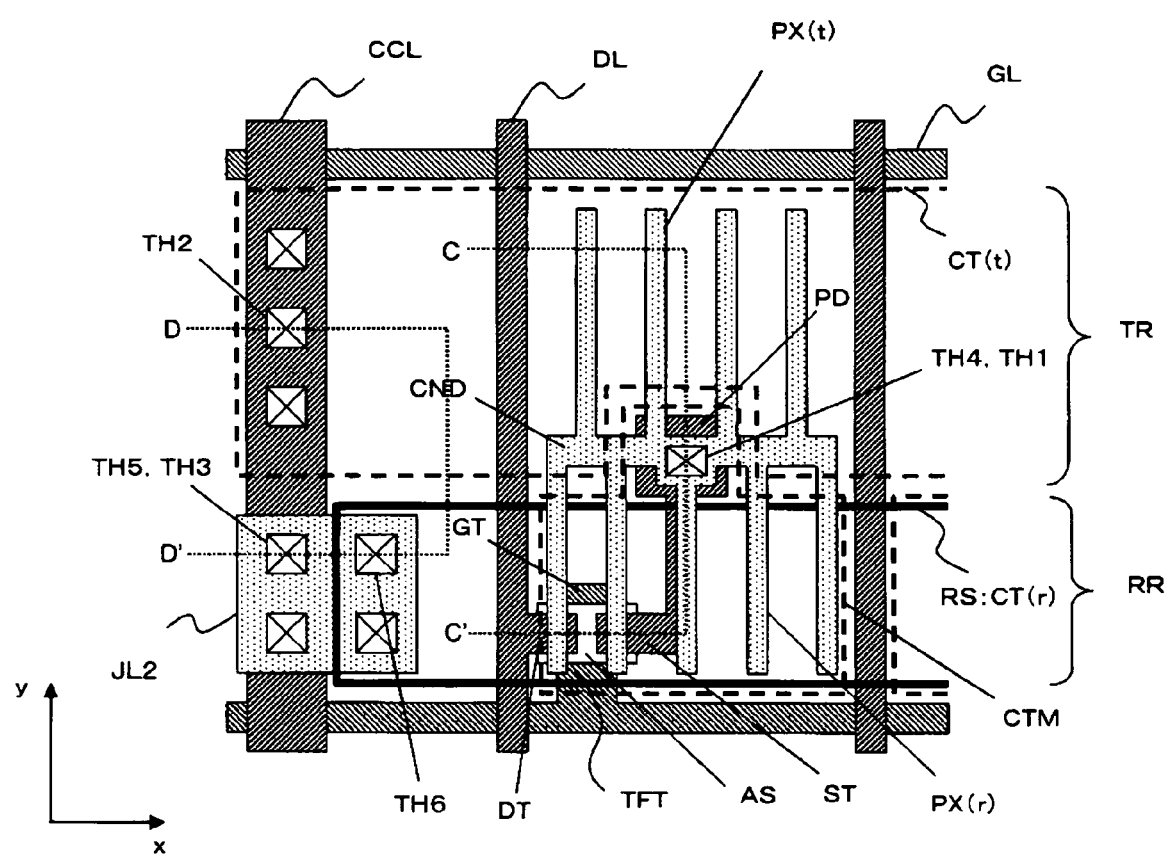
FIG. 3 is a plan view showing a pixel of a liquid crystal display device according to a first preferred embodiment of the present invention.
Figure 4:
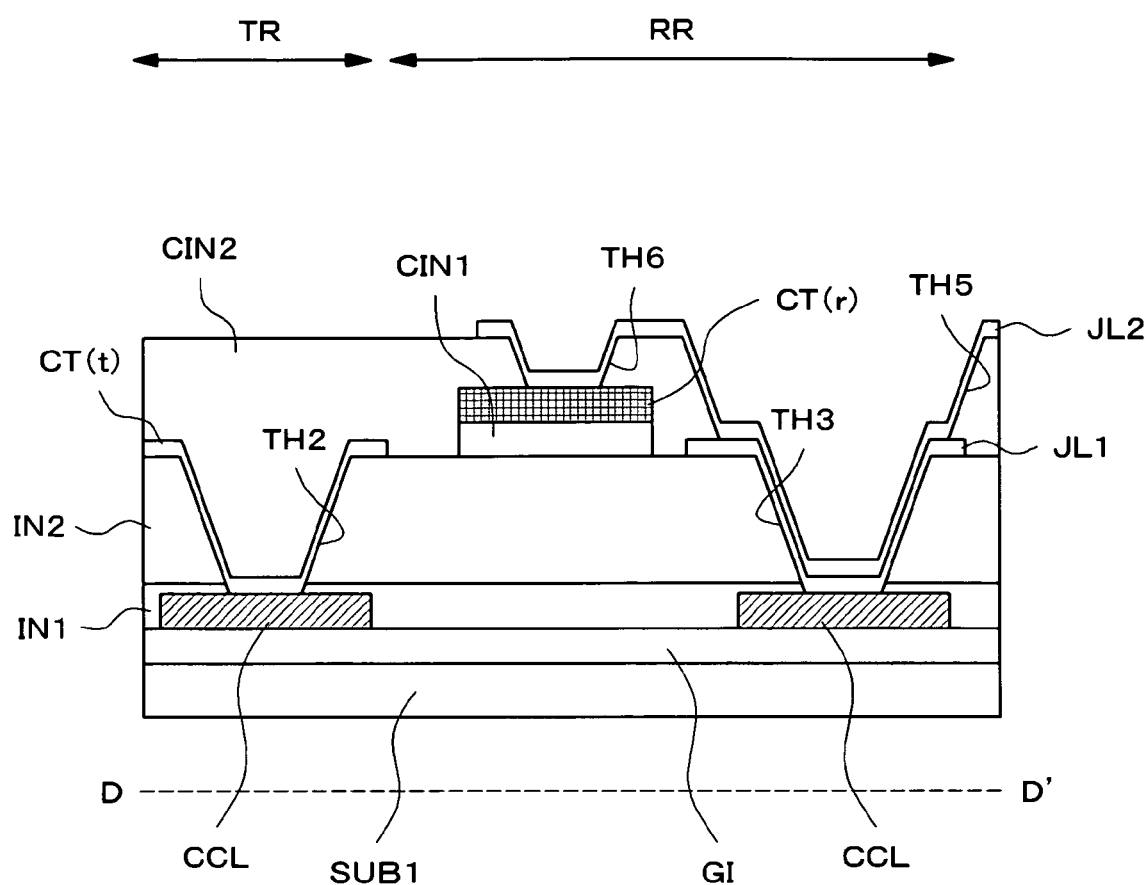
FIG. 4 is a cross sectional view showing a pixel of a liquid crystal display device according to a first preferred embodiment of the present invention and is a cross sectional view along a D-D' line of FIG. 3.

FIG. 3 is a plan view showing an example structure of a pixel in the dotted line frame A of FIG. 2. FIG. 3 shows the opposing voltage common signal line CCL, and also a connection form between the opposing voltage common signal line CCL and the opposing electrodes CT(t) and CT(r) of the pixel. A cross sectional view along C-C' line in FIG. 3 is shown in FIG. 1 and a cross sectional view along D-D' line in FIG. 3 is shown in FIG. 4.

FIG. 3 shows the substrate SUB1 (refer to FIGS. 1 and 4), and the gate signal lines GL which extend in the x direction in FIG. 3 are formed aligned in the y direction in FIG. 3 over a surface of the substrate SUB1 on the side near the liquid crystal.

A pair of adjacent gate signal lines GL define a pixel region with a pair of adjacent drain signal lines DL which will be described later.

Here, the pixel region comprises the transmissive region TR and the reflective region RR which are region-wise separated, and, in the present embodiment, for example, of the two regions separated by a line parallel to the gate signal line GL, the lower region on the figure is set as the reflective region RR and the upper region is set as the transmissive region TR.

Of the gate signal lines GL, the gate signal line GL on the side adjacent to the reflective region RR has an extension portion which protrudes toward the side of the reflective region RR at a part of the gate signal line GL, and the extension portion forms a gate electrode GT of the thin film transistor TFT to be described later.

Over the surface of the substrate SUB1, an insulating film GI (refer to FIGS. 1 and 4) is formed covering the gate signal line GL (gate electrode GT). The insulating film GI functions as a gate insulating film of the thin film transistor TFT in the formation region of the thin film transistor TFT.

Over a surface of the insulating film GI, an island-shaped semiconductor layer AS is formed in a manner to straddle over the gate electrode GT. The semiconductor layer AS functions as a semiconductor layer of the thin film transistor TFT, and a reverse stagger structure (bottom-gate type) MIS transistor is formed by forming, over an upper surface of the semiconductor layer AS, a drain electrode DT and a source electrode ST which are placed to oppose each other.

In the MIS transistor, the drain electrode DT and the source electrode ST are switched depending on the state of application of the bias. In this description, for the purpose of ease of the description, the electrode connected to the drain signal line DL to be described later is referred to as the drain electrode DT and the electrode connected to the pixel electrode PX to be described later is referred to as the source electrode ST.

Over the upper surface of the insulating film GI, the drain signal lines DL which extend in the y direction in FIG. 3 are formed aligned in the x direction in FIG. 3.

The drain signal line DL has, at a part of the drain signal line DL, a protruding portion which is formed extending to the upper surface of the semiconductor layer AS. The protruding portion forms the drain electrode DT of the thin film transistor TFT.

The source electrode ST of the thin film transistor TFT is formed at the same time as, for example, the formation of the drain signal line DL, and extends to reach from the upper surface of the semiconductor layer AS to a pixel region in which the semiconductor layer AS is not formed and to have an end approximately at the center of the pixel region.

The end of the source electrode ST forms a pad portion PD which achieves an electrical connection with the pixel electrode PX to be described later, and is formed with a relatively large area.

The opposing voltage common signal line CCL which extends in the y direction in FIG. 3 is formed on the left side of the image display region AR. The opposing voltage common signal line CCL is formed at the same time as, for example, the formation of the drain signal line DL (drain electrode DT) and the source electrode ST (pad portion PD).

Over the upper surface of the substrate SUB1, a first insulating film IN1 (refer to FIGS. 1 and 4) comprising an inorganic material such as, for example, a silicon nitride film, and a second insulating film IN2 (refer to FIGS. 1 and 4) comprising an organic material such as, for example, an acrylic film are layered and formed covering the thin film transistor TFT and the opposing voltage common signal line CCL which are formed as described above.

In this structure, the second insulating film IN2 is formed by coating, and has a flattened surface in the transmissive region TR.

The layered film of the first insulating film IN1 and the second insulating film IN2 functions, for example, as a protective film for avoiding direct contact between the thin film transistor TFT and the liquid crystal and for preventing characteristic degradation of the thin film transistor TFT.

In the second insulating film IN2, a plurality of distributed projection surfaces (depression surfaces) are formed on the surface of the reflective region RR. The uneven surface is provided in order that the uneven surface surfaces and appears on the surface of the reflective plate RS when the reflective plate RS to be described later is formed in the reflective region RR.

With the formation of the uneven surface on the reflective plate RS, it is possible to cause scattering in the reflected light by the reflective plate RS.

A coaxial contact hole TH1 is formed through the second insulating film IN2 and the first insulating film IN1, so that the center portion of the pad portion PD is exposed by the contact hole TH1, in order to achieve an electrical connection through the contact hole TH1 between the pixel electrode PX to be described later and the source electrode ST of the thin film transistor TFT.

At a portion overlapping the opposing voltage common signal line CCL, a contact hole TH2 for exposing a part of the opposing voltage common signal line CCL is formed at the portion on the side of the transmissive region TR and a contact hole TH3 for exposing a part of the opposing voltage common signal line CCL is formed on the portion on the side of the reflective region RR.

This configuration is employed in order to connect the opposing electrode CT(t) in the transmissive region TR to the opposing voltage common signal line CCL through the contact hole TH2 and connect the opposing electrode CT(r) in the reflective region RR to the opposing voltage common signal line CCL through the contact hole TH3.

The contact holes TH2 and TH3 are formed at the same time as, for example, the formation of the contact hole TH1.

Over a surface of the second insulating film IN2, a transparent conductive film comprising, for example, ITO (Indium Tin Oxide) is formed covering the contact holes TH1, TH2, and TH3.

The transparent conductive film is physically separated to a portion formed in the transmissive region TR and a portion formed in the reflective region RR, and the transparent conductive film formed in the transmissive region TR and the transparent conductive film formed in the reflective region RR have different electrical functions.

More specifically, the transparent conductive film formed in the reflective region RR is electrically connected to the pad portion PD through the contact hole TH1, is formed in an island-shape only in the reflective region RR, and forms one electrode CTM of the storage capacitor C3.

The transparent conductive film forming one of the electrodes of the storage capacitor CTM is formed covering the surface of the second insulating film IN2 on which the uneven surface is formed, and, thus, the uneven surface surfaces and appears on the surface of the transparent conductive film.

The transparent conductive film formed in the transmissive region TR is formed not being connected to the pad portion PD, and functions as the opposing electrode CT in the transmissive region TR.

The opposing electrode CT is formed connected to the opposing electrode CT in the transmissive region TR of another adjacent pixel in the x direction in FIG. 3, in a straddling manner over the drain signal line DL.

Because of this structure, the opposing electrode CT corresponding to another adjacent pixel in the x direction functions as an opposing electrode in that pixel, and also as the opposing voltage signal line CL shown in FIG. 2.

The transparent conductive film formed in this manner has a function as the opposing voltage signal line CL as described above. Therefore, the transparent conductive film is electrically connected to the opposing voltage common signal line CCL, for example, at the portion of the through hole TH2 at the left end.

At the through hole TH3 on the side of the reflective region RR, the transparent conductive film is left and formed only in the region of the through hole TH3 and a region around the through hole TH3, and a first joint structure JL1 is formed by the transparent conductive film. As will be described later, the first joint structure JL1 is a constituent element when the opposing electrode CT(r) in the reflective region RR is connected to the opposing voltage common signal line CCL.

In the reflective region RR, a first capacitor insulating film CIN1 (refer to FIG. 1) is formed in an island shape above the transparent conductive film which is formed as one capacitor electrode CTM of the storage capacitor C3.

The first capacitor insulating film CIN1 comprises, for example, a silicon nitride film, and is formed covering the surface of the capacitor electrode CTM on which the uneven surface is formed. Because of this, the uneven surface surfaces and appears on a surface of the first capacitor insulating film CIN1.

Over an upper surface of the first capacitor insulating film CIN1, a reflective plate RS is formed covering the first capacitor insulating film CIN1. The reflective plate RS comprises, for example, aluminum, and because the reflective plate RS is formed covering the surface of the first capacitor insulating film CIN1 on which the uneven surface is formed, the uneven surface surfaces and appears on the surface of the reflective plate RS.

The reflective plate RS is formed connected to the reflective plate RS in the reflective region RR of another pixel adjacent in the x direction in FIG. 3 in a straddling manner over the drain signal line DL.

The reflective plate RS functions as the opposing electrode CT(r) in the reflective region, and also forms the other capacitor electrode of the storage capacitor C3 having the first capacitor insulating film CIN1 as a dielectric film, and a voltage which forms a reference for the image signal is applied.

Because of this structure, the reflective plates RS (opposing electrodes CT(r)) commonly connected in the pixels aligned in the x direction in FIG. 3 are formed at the left end to extend, along with the first capacitor insulating film CIN1 which is present below the reflective plate RS, to a region near the position of formation of the opposing voltage common signal line CCL. As will be described later, this configuration is employed in order to electrically connect the opposing electrode CT(r) to the opposing voltage common signal line CCL.

Over an upper surface of the substrate SUB1, a second capacitor insulating film CIN2 (refer to FIGS. 1 and 4) is formed covering the reflective plate RS or the like. The second capacitor insulating film CIN2 comprises an organic insulating film such as, for example, an acrylic film, and is formed with a flattened surface.

In the second capacitor insulating film CIN2 thus formed, a contact hole TH4 for exposing a center portion of the pad portion PD is formed. Because of this, the contact hole TH4 in the second capacitor insulating film CIN2 is formed approximately coaxially with the contact hole TH1 formed through the layered film of the first insulating film IN1 and the second insulating film IN2.

In addition, in the second capacitor insulating film CIN2, a contact hole TH5 for exposing the contact hole TH3 formed through the layered film of the first insulating film IN1 and the second insulating film IN2 and a contact hole TH6 (refer to FIG. 4) for exposing a part of the reflective plate RS (opposing electrode CT(r)) formed extending to a region near the opposing voltage common signal line CCL are formed. The contact hole TH5 is formed in order to electrically connect the opposing electrode CT(r) in the reflective region RR to the opposing voltage common signal line CCL.

Over a surface of the second capacitor insulating film CIN2, a transparent conductive film which comprises, for example, ITO (Indium Tin Oxide) is formed covering the contact holes TH4, TH5, and TH6.

The transparent conductive film functions, in the reflective region RR and the transmissive region TR, as the pixel electrode PX electrically connected to the source electrode ST (pad portion PD) of the thin film transistor TFT through the contact holes TH1 and TH4.

More specifically, the pixel electrode PX(t) is formed in the transmissive region TR and the pixel electrode PX(r) is formed in the reflective region RR. The pixel electrodes PX(t) and PX(r) form, for example, a group of electrodes of line-shaped electrodes which extend in the y direction in FIG. 3 and which are aligned in the x direction, and are formed in a pattern connected to a conductive layer CND formed connected to the pad portion PD through the contact holes TH4 and TH1 at a boundary of the reflective region RR and the transmissive region TR.

In this case, the pixel electrode PX(t) is formed overlapping the opposing electrode CT(t) and a storage capacitor C1 having, as the dielectric film, the second capacitor insulating film CIN2 interposed between the pixel electrode PX(t) and the opposing electrode CT(t) is formed. The pixel electrode PX(r) is formed overlapping the opposing electrode CT(r), and a storage capacitor C2 having, as the dielectric film, the second capacitor insulating film CIN2 interposed between the pixel electrode PX(r) and the opposing electrode CT(r) is formed.

The transparent conductive film formed over the upper surface of the second capacitor insulating film CIN2 covers the through hole TH5 and the through hole TH6 at a region near the opposing voltage signal line CCL at the side of the reflective region RR, to form a second joint structure JL2.

With this structure, the opposing electrode CT(r) in the reflective region RR is electrically connected to the opposing voltage signal line CCL through the second joint structure JL2 and the first joint structure JL1.

Figure 7A:
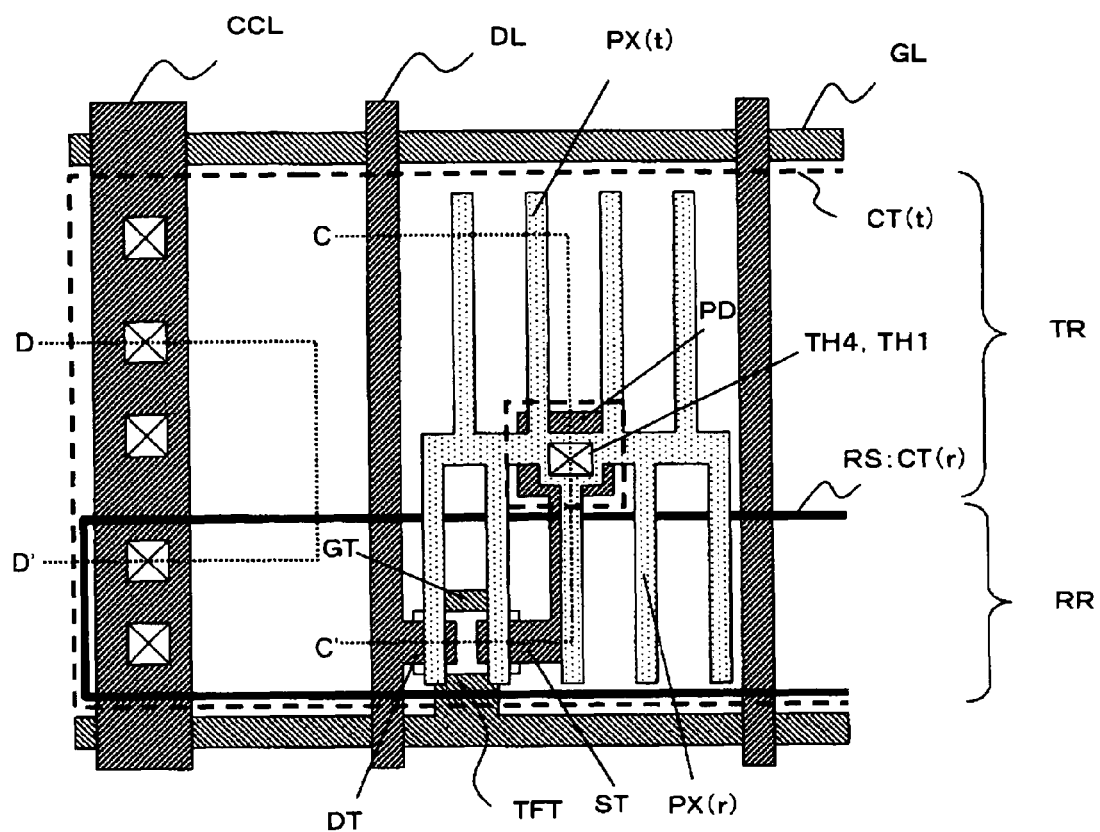
FIG. 7A is a structural diagram showing an example pixel of a liquid crystal display device of related art.
Figure 7B:
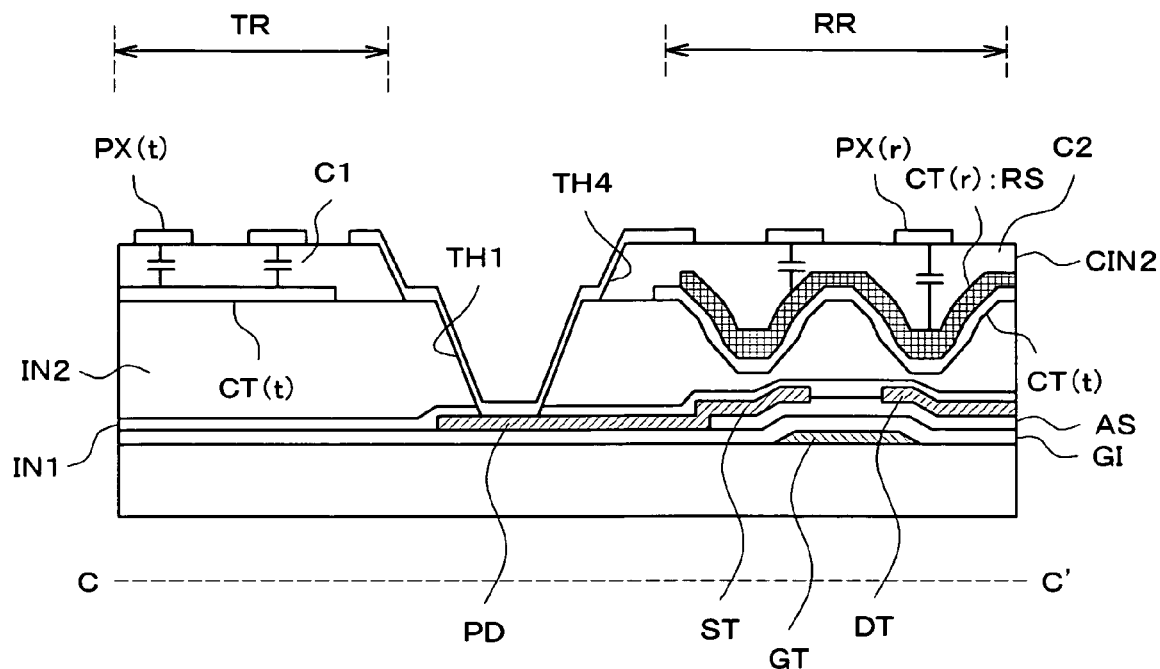
FIG. 7B is a cross sectional view along C-C' line of FIG. 7A.
Figure 7C:
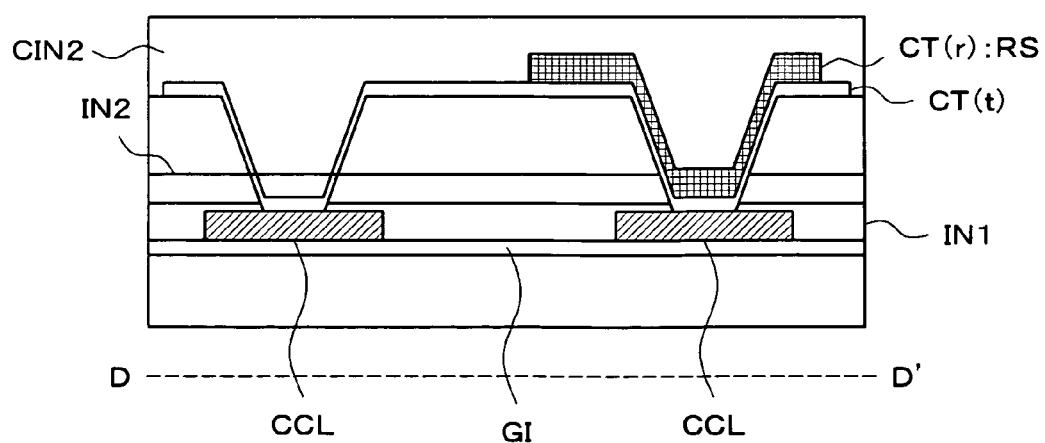
FIG. 7C is a cross sectional view along D-D' line of FIG. 7A.

FIGS. 7A-7C are structural diagrams showing an example pixel in a liquid crystal display device of related art. FIG. 7A is a plan view, FIG. 7B is a cross sectional view along C-C' line of FIG. 7A, and FIG. 7C is a cross sectional view along D-D' line of FIG. 7A.

FIG. 7A corresponds to FIG. 3, FIG. 7B corresponds to FIG. 1, and FIG. 7C corresponds to FIG. 4, and members shown with the same reference numerals are members having the same functions.

As is clear from a comparison with the structure of the pixel of the liquid crystal display device of related art, in the pixel of the present embodiment, the first capacitor insulating film CIN1 is newly provided in the reflective region.

The first capacitor insulating film CIN1 is formed over an upper surface of the capacitor electrode CTM, which is a transparent conductive film formed at the same time as the opposing electrode CT(t) in the transmissive region TR and which is physically and electrically separated from the opposing electrode CT(t), and which is formed in electrical connection to the source electrode ST (pad portion PD) of the thin film transistor TFT.

Over an upper surface of the first capacitor insulating film CIN1, the opposing electrode CT(r) which also functions as the reflective plate RS is formed, and the opposing electrode CT(r) functions as the other capacitor electrode forming a pair with the capacitor electrode CTM, so that the storage capacitor C3 having the first capacitor insulating film CIN1 as a dielectric film is formed.

Because of this, according to the structure of the pixel in the present embodiment, the new storage capacitor C3 can be formed without an increase in an occupied area of the pixel, and the storage capacity can consequently be increased.

The storage capacitor C3 comprising the sequentially layered structure of the capacitor electrode CTM, the first capacitor insulating film CIN1, and the opposing electrode CT(r) which functions as the other capacitor electrode has a structure in which the uneven surface formed in the opposing electrode CT(r) surfaces and appears on the first capacitor insulating film CIN1 and the capacitor electrode CTM.

Because of this, the storage capacitor C3 actually has a larger area than the area projected on a plane, and the capacity value of the storage capacitor C3 can be increased.

[Manufacturing Method]

FIGS. 5A-5E are step diagrams showing an example method of manufacturing the liquid crystal display device of the present embodiment, and show steps at a location corresponding to the cross section shown in FIG. 1. The steps will now be described in order.

Figure 5A:
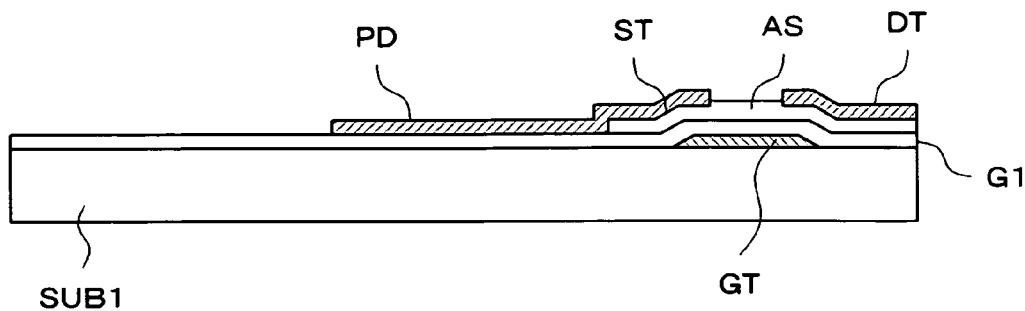
FIG. 5A is a step diagram showing an example of a manufacturing method of a liquid crystal display device according to a first preferred embodiment of the present invention.

Step 1 (refer to FIG. 5A)

A substrate SUB1 is prepared, a gate signal line GL is formed over a surface of the substrate SUB1 on the side near the liquid crystal, and an insulating film GI is formed covering the gate signal line GL. In FIG. 5A, a gate electrode GT which is integrally formed with the gate signal line GL is shown.

Over an upper surface of the insulating film GI, an island-shaped semiconductor layer AS is formed in a manner to straddle over the gate electrode GT. The semiconductor layer AS comprises, for example, amorphous Si, but is not limited to such a structure. For example, the semiconductor layer AS may alternatively be poly-Si.

A drain signal line DL, a drain electrode DT which is integral with the drain signal line DL, a source electrode ST, and a pad portion PD which is integral with the source electrode ST are formed.

Figure 5B:
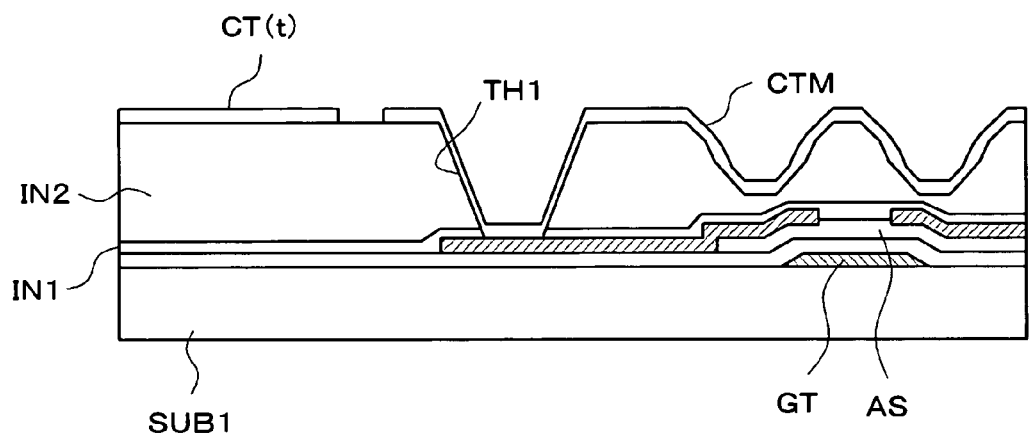
FIG. 5B is a step diagram showing an example of a manufacturing method of a liquid crystal display device according to a first preferred embodiment of the present invention.

Step 2 (refer to FIG. 5B)

Over the upper surface of the substrate SUB1, a first insulating film IN1 is formed with, for example, a silicon nitride film, and a second insulating film IN2 is then formed with, for example, an acrylic film.

Over a surface of the second insulating film IN2 in the reflective region RR, an uneven surface DP in which projections (depressions) are distributed is formed through a selective etching method using, for example, photolithography techniques using a halftone mask.

In addition, a coaxial through hole TH1 passing through the second insulating film IN2 and the first insulating film IN1 is formed, and a center portion of the pad section PD is exposed. In this case, the through holes TH2 and TH3 shown in FIG. 4 are also formed at the same time.

Over an upper surface of the second insulating film IN2, a transparent conductive film comprising, for example, ITO (Indium Tin Oxide) is formed covering the uneven surface DP and the through holes TH1, TH2, and TH3.

The transparent conductive film is formed in a predetermined pattern so that one capacitor electrode CTM of the storage capacitor C3 connected to the pad portion PD through the through hole TH1 is formed in the reflective region RR and the opposing electrode CT(t) is formed in the transmissive region TR.

In this case, during the formation of the predetermined pattern of the transparent conductive film, as shown in FIG. 4, the first joint structure JL1 which covers the through hole TH3 and which is electrically connected to the opposing voltage common signal line is formed. In addition, the opposing electrode CT(t) is set to be electrically connected to the opposing voltage common signal line CCL through the through hole TH2 as shown in FIG. 4.

Figure 5C:
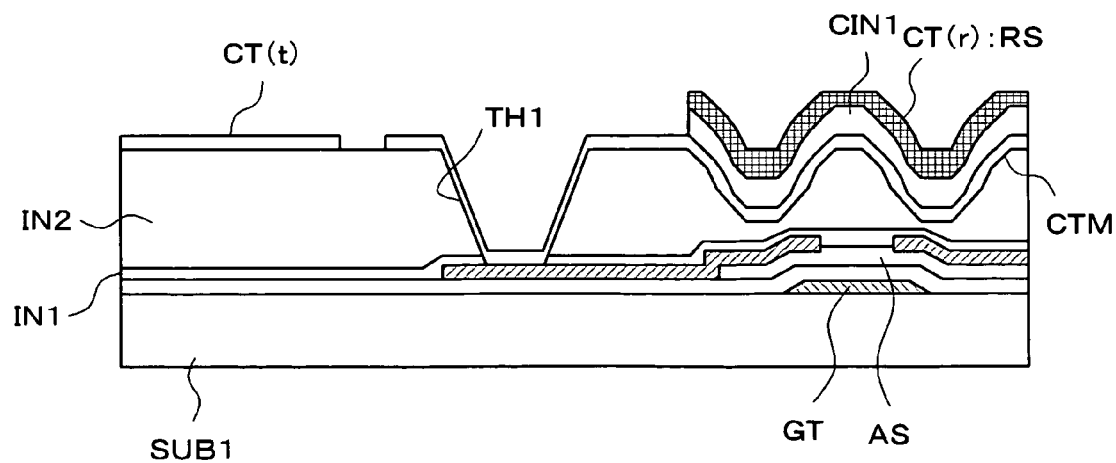
FIG. 5C is a step diagram showing an example of a manufacturing method of a liquid crystal display device according to a first preferred embodiment of the present invention.

Step 3 (refer to FIG. 5C)

Over an upper surface of the substrate SUB1, a first capacitor insulating film CIN1 comprising, for example, a silicon nitride film, and an aluminum film are sequentially formed covering the transparent conductive film, and the aluminum film and the first capacitor insulating film CIN1 are simultaneously patterned by selective etching using photolithography techniques.

Because of this, in this manufacturing method, it is not necessary to separately pattern the first capacitor insulating film, and the number of manufacturing steps can be reduced.

The first capacitor insulating film CIN1 is formed as the dielectric film of the storage capacitor C3, the aluminum film is formed as the opposing electrode CT(r) in the reflective region RR, and the opposing electrode CT(r) is formed also as the reflective plate RS and the other capacitor electrode of the storage capacitor C3.

In the opposing electrode CT(r), the uneven surface DP formed on the surface of the second insulating film IN2 surfaces and appears on the surface with the first capacitor insulating film CIN1 therebetween.

Figure 5D:
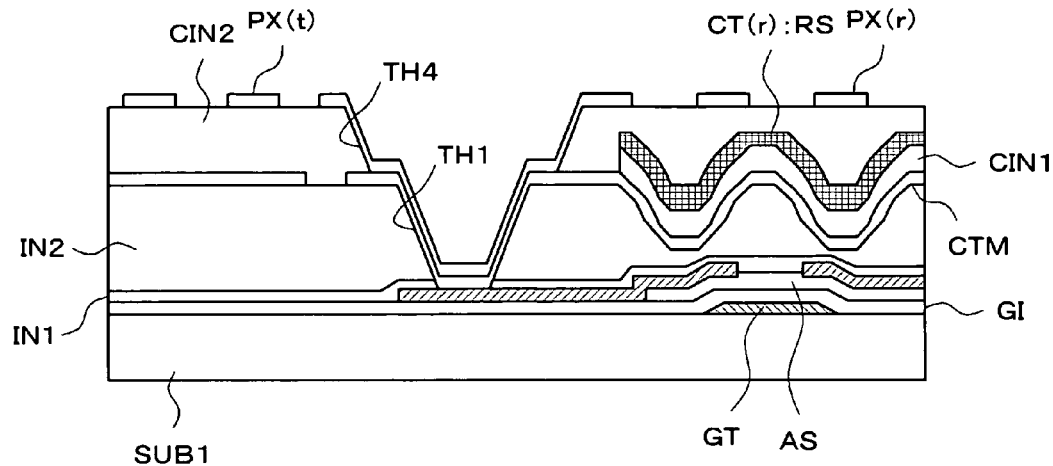
FIG. 5D is a step diagram showing an example of a manufacturing method of a liquid crystal display device according to a first preferred embodiment of the present invention.

Step 4 (refer to FIG. 5D)

Over an upper surface of the substrate SUB1, a second capacitor insulating film CIN2 comprising, for example, an acrylic film is formed covering the opposing electrodes CT(t) and CT(r).

A through hole TH2 is formed through the second capacitor insulating film CIN2 for exposing the center portion of the pad portion PD. With this configuration, the through hole TH2 is formed approximately coaxially with the through hole TH1 formed through the layered structure of the first insulating film IN1 and the second insulating film IN2. During this process, a through hole TH5 shown in FIG. 4 is formed at the same time.

Over an upper surface of the second capacitor insulating film CIN2, a transparent conductive film comprising, for example, ITO (Indium Tin Oxide) is formed covering the through hole TH4, and the transparent conductive film is patterned so that a pixel electrode PX(r) in the reflective region RR and a pixel electrode PX(t) in the transmissive region TR are formed.

These pixel electrodes PX(r) and PX(t) are formed electrically connected to the source electrode ST (pad portion PD) of the thin film transistor TFT through the through holes TH4 and TH1.

During this process, the second joint structure JL2 shown in FIG. 4 is formed at the same time, so that the opposing electrode CT(r) in the reflective region RR is connected to the opposing voltage common signal line CCL through the second joint structure JL2 and the first joint structure JL1.

Figure 5E:
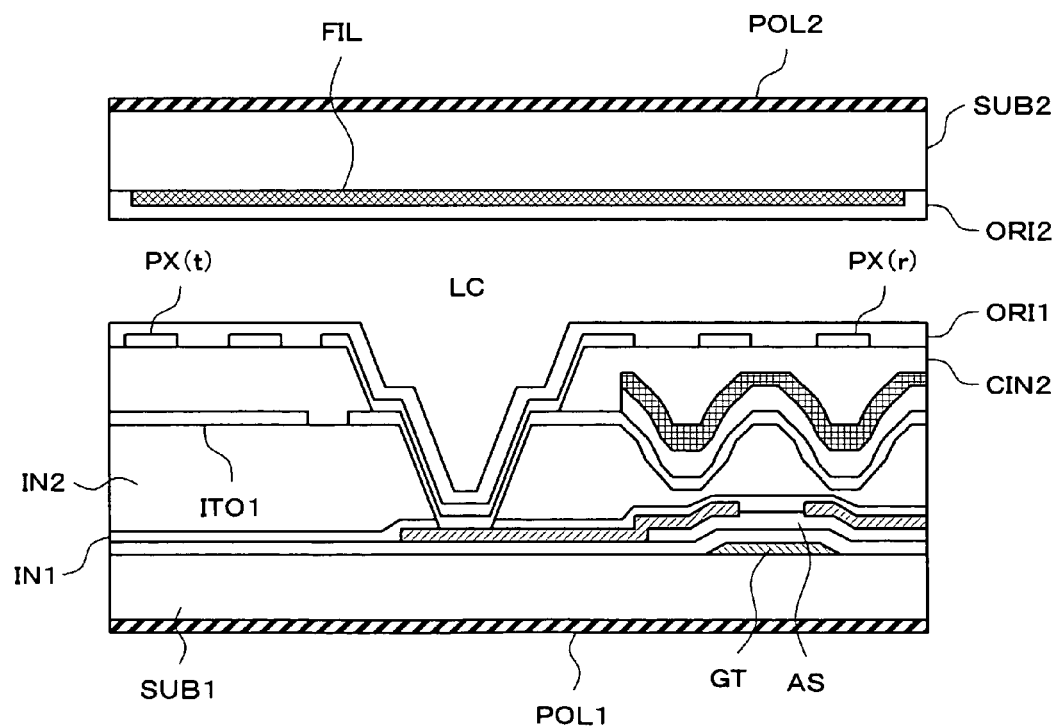
FIG. 5E is a step diagram showing an example of a manufacturing method of a liquid crystal display device according to a first preferred embodiment of the present invention.

Step 5 (refer to FIG. 5E)

Over an upper surface of the substrate SUB1, an orientation film ORI1 is formed covering the pixel electrodes PX(t) and PX(r) The orientation film ORI1 is a film which directly contacts the liquid crystal LC, and sets an initial orientation direction of molecules of the liquid crystal LC.

A polarizer plate POL1 is placed over a surface of the substrate SUB1 on the side opposite to the liquid crystal. The polarizer plate POL1 is provided in order to visualize the behavior of the liquid crystal LC by the electric field.

FIG. 5E also shows a substrate SUB2 to be placed opposing the substrate SUB1, which is formed through the above-described processes, with the liquid crystal LC therebetween.

On the substrate SUB2, a color filter FIL is formed over a surface on the side near the liquid crystal, and an orientation film ORI2 is formed covering the color filter FIL. The orientation film ORI2 has a function similar to the orientation film ORI1.

A polarizer plate POL2 is placed over the surface of the substrate SUB2 on the side opposite to the liquid crystal. The polarizer plate POL2 has a function similar to the polarizer plate POL1.

Second Preferred Embodiment (Overall Equivalent Circuit)

Figure 8:
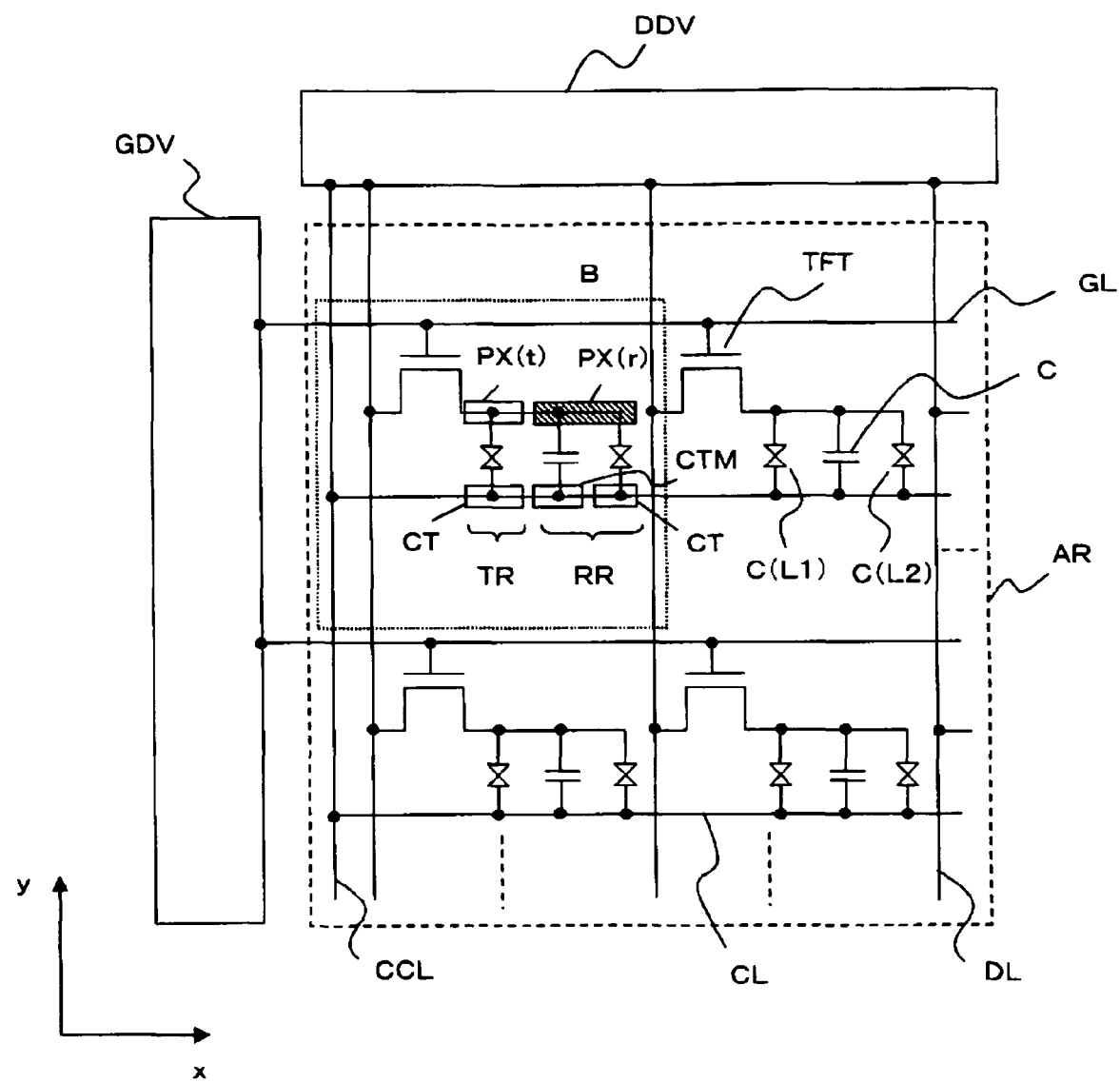
FIG. 8 is an equivalent circuit diagram showing a liquid crystal display device according to a second preferred embodiment of the present invention.

FIG. 8 is an equivalent circuit diagram of a liquid crystal display device which is called a TN (Twisted Nematic) type or a VA (Vertical Alignment) type, and is drawn corresponding to FIG. 2. In FIG. 8, the members having the same reference numeral as FIG. 2 have the same functions.

The TN type or VA type liquid crystal display device has a structure in which an opposing electrode CT is provided over a surface of the substrate SUB2, which is placed opposing the substrate SUB1 with the liquid crystal therebetween, on the side near the liquid crystal. In FIG. 8, in addition to the circuits formed on the side of the substrate SUB1, the opposing electrode CT is also shown.

In FIG. 8, a structure different from the structure of FIG. 2 is that the pixel electrode PX connected to the source electrode ST of the thin film transistor TFT is formed with a transparent conductive film in the pixel electrode PX(t) formed in the transmissive region TR and is formed with the reflective plate RS in the pixel electrode PX(r) formed in the reflective region RR.

An opposing electrode CT which creates an electric field with the pixel electrode PX is formed over a surface of the other substrate SUB2, which is placed opposing the substrate SUB1 with the liquid crystal LC therebetween, on the side near the liquid crystal LC.

The opposing electrode CT is electrically connected to the opposing voltage common signal line CCL through a conductive layer (not shown) which is provided between the substrates SUB1 and SUB2, and an opposing voltage signal is supplied to the opposing electrode CT through the opposing voltage common signal line CCL.

A liquid crystal capacity C (L1) is formed between the pixel electrode PX(t) and the opposing electrode CT, and a liquid crystal capacity C (L2) is formed between the pixel electrode PX(r) and the opposing electrode CT.

In addition, in the reflective region RR of the pixel on the side of the substrate SUB1, a capacitor electrode CTM which is electrically connected to the opposing voltage common signal line CCL is formed, and the capacitor electrode CTM forms a storage capacitor C with the pixel electrode PX(r) in the reflective region RR.

[Structure of Pixel]

Figure 9:
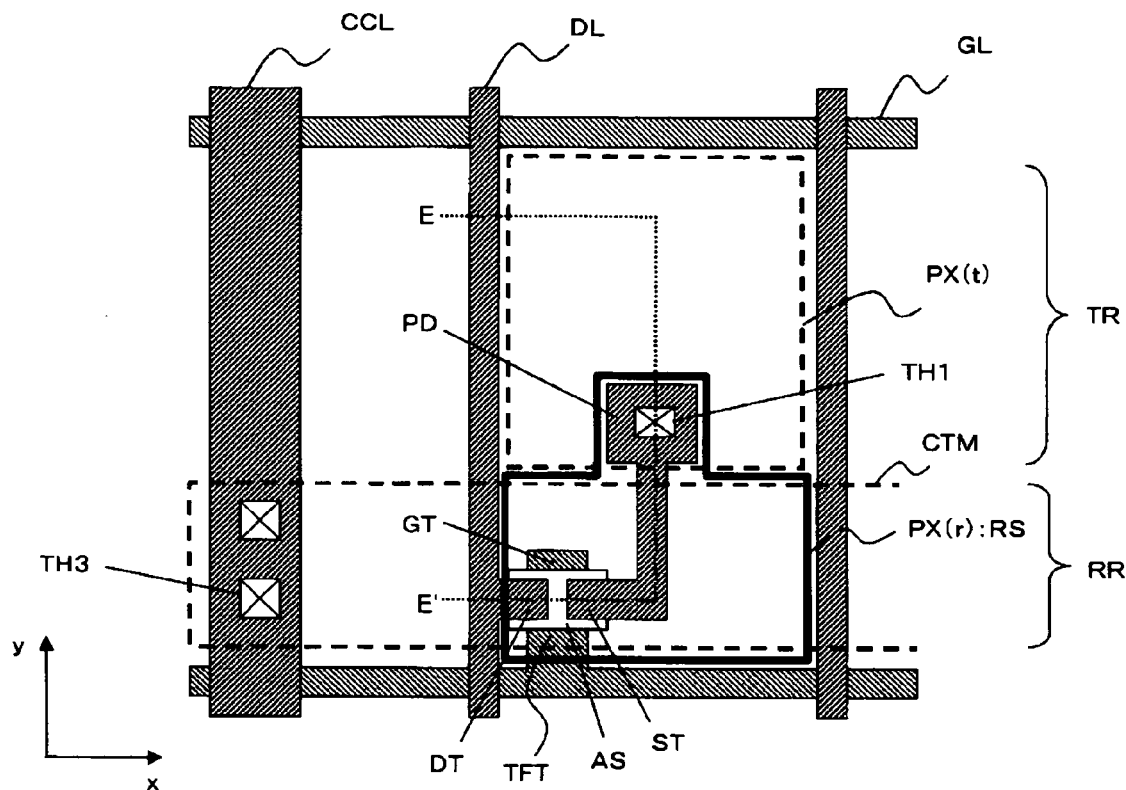
FIG. 9 is a plan view showing a pixel of a liquid crystal display device according to a second preferred embodiment of the present invention.
Figure 10:
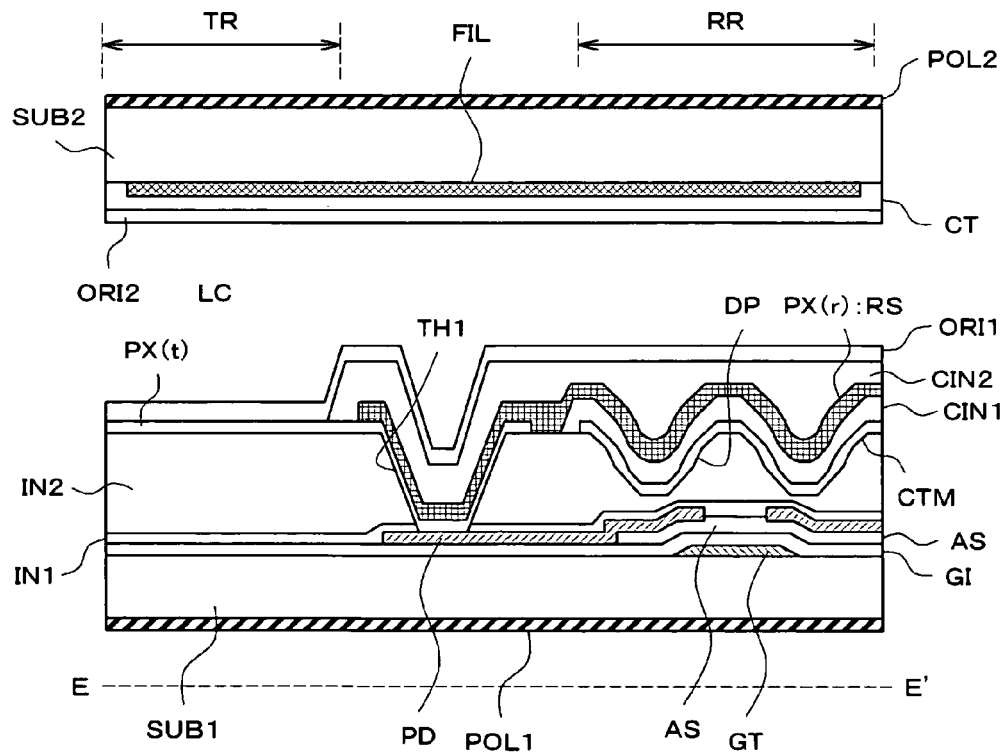
FIG. 10 is a cross sectional view along E-E' line of FIG. 9.

FIG. 9 is a plan view showing an example structure of a pixel in a dotted line frame B of FIG. 8. FIG. 9 shows the opposing voltage common signal line CCL and the connection form between the opposing voltage common signal line CCL and the capacitor electrode CTM of the pixel. FIG. 10 shows a cross sectional view along E-E' line of FIG. 9.

FIG. 9 corresponds to FIG. 3 and FIG. 10 corresponds to FIG. 1. In FIGS. 9 and 10, members with the same reference numerals as FIGS. 3 and 1 have the same functions.

In FIGS. 9 and 10, a first insulating film IN1 and a second insulating film IN2 are formed over an upper surface of the substrate SUB1 covering a thin film transistor TFT, an uneven surface DP is formed on a surface of the second insulating film IN2 in a reflective region RR, and a through hole TH1 for exposing the center portion of the pad portion PD is formed through the layered structure of the first insulating film IN1 and the second insulating film IN2. This structure is similar to the structure shown in FIGS. 3 and 1.

Because of this structure, the drain signal line DL which is integrally formed with the drain electrode of the thin film transistor TFT, and the opposing voltage signal line CCL which is formed at the same time as the formation of the drain signal line DL are also formed below the layered structure of the first insulating film IN1 and the second insulating film IN2, similar to FIGS. 3 and 1.

Over the upper surface of the second insulating film IN2, a transparent conductive film comprising, for example, ITO (Indium Tin Oxide) is formed, and the transparent conductive film forms a pixel electrode PX(t) in the transmissive region TR and forms the capacitor electrode CTM in the reflective region RR. The pixel electrode PX(t) is electrically connected to the pad portion PD through the through hole TH, and is physically separated from the capacitor electrode CTM so that an electrical insulation is achieved.

The capacitor electrode CTM is formed common with the capacitor electrode CTM in the pixel adjacent in the x direction in FIG. 9 straddling over the drain signal line DL. The left end in FIG. 9 of the capacitor electrode CTM is electrically connected to the opposing voltage signal line CCL through the through hole TH3 formed through the layered structure of the first insulating film IN1 and the second insulating film IN2. The through hole TH3 is formed, for example, at the same time as the formation of the through hole TH1.

In the capacitor electrode CTM, the uneven surface DP formed on the surface of the second insulating film IN2 surfaces and appears on the surface.

Over an upper surface of the capacitor electrode CTM, a first capacitor insulating film CIN1 (refer to FIG. 10) comprising, for example, a silicon nitride film, is formed in at least a region in which the reflective plate RS to be described later is formed in an overlapping manner. The first capacitor insulating film CIN1 functions as a dielectric film of the storage capacitor C. In the first capacitor insulating film CIN1, the uneven surface DP formed on the surface of the second insulating film IN2 surfaces and appears on the surface with the capacitor electrode CTM therebetween.

In the reflective region RR, the reflective plate RS comprising, for example, aluminum is formed. The reflective plate RS is formed covering the through hole TH1 so that the reflective plate RS is electrically connected to the source electrode ST of the thin film transistor TFT and functions as the pixel electrode PX(r) in the reflective region RR.

In the reflective plate RS, the uneven surface DP formed on the surfaced of the second insulating film IN2 surfaces and appears on the surface with the capacitor electrode CTM and the first capacitor insulating film CIN1 therebetween. With this structure, the light incident on the reflective plate RS is reflected in a scattered manner.

In addition, in the reflective region RR, a second capacitor insulating film CIN2 comprising, for example, an acrylic film is formed covering the pixel electrode PX(r) (reflective plate RS).

The second capacitor insulating film CIN2 is placed between the pixel electrode PX(r) and the opposing electrode CT formed over the surface of the substrate SUB2 on the side near the liquid crystal to be described later, and forms a storage capacity C (L2) between the pixel electrode PX(r) and the opposing electrode CT along with the liquid crystal LC.

The second capacitor insulating film CIN2 also has a function to set the thickness of the liquid crystal LC in the reflective region RR to be approximately ½ of the thickness of the liquid crystal LC in the transmissive region TR so that the optical path length required for the round-trip travel of the light within the liquid crystal LC in the reflective region RR is approximately the same as the optical path length of the light within the liquid crystal LC in the transmissive region TR.

An orientation film ORI1 is formed over a surface of the substrate SUB1 having such a structure. The orientation film ORI1 is a film which directly contacts the liquid crystal LC, and determines an initial orientation direction of molecules of the liquid crystal LC.

In a liquid crystal display device having such a structure also, the new storage capacitor C can be formed without increasing the occupied area of the pixel, and, consequently, the storage capacity can be increased.

In addition, the storage capacitor C formed by the sequentially layered structure of the capacitor electrode CTM, the first capacitor insulating film CIN1, and the pixel electrode PX (r) forming the other capacitor electrode has a structure in which the uneven surface formed in the capacitor electrode CTM surfaces and appears on the pixel electrode PX(r) with the first capacitor insulating film CIN1 therebetween.

Because of this, the storage capacitor C actually has a larger area than the area projected onto a plane, and, thus, the capacity value of the storage capacitor C can be increased.

FIG. 10 also shows the substrate SUB2 which is placed opposing the substrate SUB1 with the liquid crystal LC therebetween.

On the substrate SUB2, a color filter FIL is formed over a surface on the side near the liquid crystal, and an opposing electrode CT comprising, for example, ITO is formed covering the color filter FIL. As already described, the opposing electrode CT is connected to the opposing voltage common signal line CCL through a conductive layer which is provided between the substrate SUB1 and the substrate SUB2 outside of the pixel display region AR.

Over the surface of the substrate SUB2 near the liquid crystal, an orientation film ORI2 is formed covering the opposing electrode CT. In addition, a polarizer plate POL2 is placed over a surface of the substrate SUB2 opposite of the liquid crystal.

[Alternative Configuration]

In the above-described embodiments, the substrates SUB1 and SUB2 comprise glass, but the present invention is not limited to such a configuration, and the substrates may comprise other insulating substrates such as, for example, quartz glass and plastic.

When quartz glass is used for the substrate, the process temperature can be increased and the density of the gate insulating film of the thin film transistor can be increased, and, thus, there is an advantage that the reliability of the thin film transistor can be improved. When, on the other hand, plastic is used for the substrate, there is an advantage that a liquid crystal display device having a light weight and a superior shock resistance can be obtained.

In the embodiments described above, the bottom-gate type transistor TFT is shown, but the present invention is not limited to such a configuration, and a top-gate type thin film transistor TFT may be employed.

The semiconductor layer of the thin film transistor TFT is not limited to the amorphous silicon, and may be, for example, poly-silicon or the like.

The embodiments and the alternative configuration may be used alone or in combination to each other. The advantage can be achieved alone or in a synergetic manner.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device having a transmissive region and a reflective region in a pixel region in which a protective film is formed covering a thin film transistor over a substrate, wherein in the reflective region, an uneven surface is formed on a surface of the protective film, and a capacitor electrode which comprises a transparent conductive film and which is electrically connected to a source electrode of the thin film transistor through a first through hole formed through the protective film, a first capacitor insulating film, and a reflective plate which also functions as an opposing electrode and in which the uneven surface formed on the protective film surfaces and appears with the capacitor electrode and the first capacitor insulating film therebetween are formed over the surface of the protective film on which the uneven surface is formed, in the transmissive region, an opposing electrode which comprises a transparent conductive film is formed over the surface of the protective film, a second capacitor insulating film is formed covering the reflective region and the transmissive region, and a pixel electrode which comprises a transparent conductive film and which is electrically connected to the source electrode of the thin film transistor through a second through hole formed through the second capacitor insulating film is provided over an upper surface of the second capacitor insulating film in the reflective region and the transmissive region.

2. The liquid crystal display device according to claim 1, wherein the reflective plate formed in the reflective region and the opposing electrode formed in the transmissive region are electrically connected to each other.

3. The liquid crystal display device according to claim 1, wherein the reflective plate formed in the reflective region forms a surface-shaped electrode, and the pixel electrode formed in the reflective region with the second capacitor insulating film therebetween forms a plurality of aligned line-shaped electrodes.

4. The liquid crystal display device according to claim 1, wherein the opposing electrode formed in the transmissive region forms a surface-shaped electrode, and the pixel electrode formed in the transmissive region with the second capacitor insulating film therebetween forms a plurality of aligned line-shaped electrodes.

5. The liquid crystal display device according to claim 1, wherein the first through hole formed through the protective film and the second through hole formed through the second capacitor insulating film are coaxially formed.

6. The liquid crystal display device according to claim 1, wherein an opposing voltage common signal line is placed at least at a part of a periphery of an image display region in which a plurality of pixels are placed, the reflective plate is commonly connected to a reflective plate of a pixel which is adjacent over a drain signal line which is connected to a drain electrode of the thin film transistor, and the commonly connected reflective plate is electrically connected to the opposing voltage common signal line.

7. The liquid crystal display device according to claim 1, wherein an opposing voltage common signal line is placed at least at a part of a periphery of an image display region in which a plurality of pixels are placed, the opposing electrode is commonly connected to an opposing electrode of a pixel which is adjacent over a drain signal line which is connected to a drain electrode of the thin film transistor, and the commonly connected opposing electrode is electrically connected to the opposing voltage common signal line.

8. The liquid crystal display device according to claim 1, wherein the substrate comprises one of glass, quartz glass, and plastic.

9. The liquid crystal display device according to claim 1, wherein the thin film transistor is of a bottom-gate type or a top-gate type.

10. A liquid crystal display device having a first substrate and a second substrate which are placed opposing each other with liquid crystal therebetween, wherein an opposing electrode is formed over a surface of the second substrate on the side near the liquid crystal, a transmissive region and a reflective region are provided in a pixel region in which a protective film is formed covering a thin film transistor over a surface of the first substrate on the side near the liquid crystal, in the reflective region, an uneven surface is formed on a surface of the protective film, and a capacitor electrode which comprises a transparent conductive film and which is maintained at a same potential as the opposing electrode, a first capacitor insulating film, and a reflective plate which is electrically connected to a source electrode of the thin film transistor through a through hole formed through the protective film and in which the uneven surface formed on the protective film surfaces and appears with the capacitor electrode and the first capacitor insulating film therebetween are formed over the surface of the protective film on which the uneven surface is formed, and in the transmissive region, a pixel electrode which comprises a transparent conductive film and which is electrically connected to the source electrode of the thin film transistor through the through hole is formed over the surface of the protective film.

11. The liquid crystal display device according to claim 10, wherein a second capacitor insulating film which is formed covering the reflective plate is provided in the reflective region.

12. The liquid crystal display device according to claim 10, wherein an opposing voltage common signal line is placed at least at a part of a periphery of an image display region in which a plurality of pixels are placed, the capacitor electrode is commonly connected to a capacitor electrode of a pixel which is adjacent over a drain signal line which is connected to a drain electrode of the thin film transistor, and the commonly connected capacitor electrode is electrically connected to the opposing voltage common signal line.

13. The liquid crystal display device according to claim 10, wherein the substrate comprises one of glass, quartz glass, and plastic.

14. The liquid crystal display device according to claim 10, wherein the thin film transistor is of a bottom-gate type or of a top-gate type.

15. A method of manufacturing a liquid crystal display device, wherein a capacitor electrode which is formed over an insulating film, a capacitor insulating film which is formed over the capacitor electrode, and a reflective plate which is formed over the capacitor insulating film are sequentially formed in a reflective region of a pixel, wherein a storage capacitor is formed with the capacitor electrode, the capacitor insulating film, and the reflective plate, and the capacitor insulating film and the reflective plate are formed by sequentially forming a material layer for forming the capacitor insulating film and a material layer for forming the reflective plate, and simultaneously patterning the material layers.

16. The method of manufacturing a liquid crystal display device according to claim 15, wherein an uneven surface is formed on a surface of the insulating film, and the capacitor electrode, the capacitor insulating film, and the reflective plate are layered over the surface of the insulating film on which the uneven surface is formed, and in the reflective plate, the uneven surface which is formed on the insulating film surfaces and appears with the capacitor electrode and the capacitor insulating film therebetween.

* * * * *